INVENTORS
CARL A. SEGERSTROM
ROBERT V. WERNER
BY Elmer J. Gorn
ATTORNEY

ELECTRONIC COMMUTATED CHANNEL SEPARATORS

Filed Nov. 1, 1952 3 Sheets-Sheet 2

INVENTORS
CARL A. SEGERSTROM
ROBERT V. WERNER
BY Elmer J. Gorn
ATTORNEY

Dec. 17, 1957 C. A. SEGERSTROM ET AL 2,816,959

ELECTRONIC COMMUTATED CHANNEL SEPARATORS

Filed Nov. 1, 1952 3 Sheets-Sheet 3

INVENTORS
CARL A. SEGERSTROM
ROBERT V. WERNER
BY Elmer J. Gorn
ATTORNEY

United States Patent Office 2,816,959
Patented Dec. 17, 1957

2,816,959

ELECTRONIC COMMUTATED CHANNEL SEPARATORS

Carl A. Segerstrom, Winchester, Mass., and Robert V. Werner, San Diego, Calif., assignors to Raytheon Manufacturing Company, Newton, Mass., a corporation of Delaware Application November 1, 1952, Serial No. 318,276

17 Claims. (Cl. 179—15)

This invention relates to an electronic commutated channel selector system, and, more particularly, relates to an electronic telemetering system for separating out commutated channel data in a multiple sequential channel system having frame reference pulses of either fixed or varying recurrence frequency.

In many applications it is desirable to transmit information from a given location, such as an aircraft, to a remote location, such as a ground station. One method of telemetering in such cases is to succesively transmit a plurality of channels by means of a mechanical commutating device which allows the transmission of a number of channels consisting of a synchronizing channel followed by a number of information channels which may be of equal width. The synchronizing channel may take the form of negative-going pulses while the information in the remaining channels is carried in terms of the magnitude of the positive voltage associated with each commutated channel. The period between successive synchronizing pulses is equal to the time required for the arm of the commutator to make a complete revolution. The spacing between channel pulses, as well as the duration of each channel pulse, is dependent upon the length and spacing of the various commutator segments as well as upon the instantaneous speed of the commutator switch. If, for example, the segments are equal in length and continuously arranged about the periphery of the commutator, with the exception of thin, electrically-insulating spacers between the adjacent segments, the spacing between adjacent channel pulses may be reduced substantially to zero, and the number of channels made substantially equal to the interval between successive synchronizing pulses divided by the channel width in terms of time.

The frame period between successive synchronizing pulses is divided into $n$ equal time intervals, thus providing one synchronizing channel and $n-1$ information channels. The amplitude of each channel pulse corresponds to the signal from each channel and is a function of the information available in that channel. It should be understood, however, that the number of channels utilized, as well as the manner of conveying information to said channel, is dependent upon the kind of information and the amount of information to be conveyed.

In order to select any one of the many information channels, the data input from the telemetering ground equipment is applied to the input terminals of the channel separator of the subject invention, and the desired channel gated out of the channel separator, in a manner to be described.

A linear sawtooth wave is generated by means of a trigger pulse derived from each negative synchronizing pulse and supplied once each revolution or frame of the mechanical commutator in the airborne telemetering unit. This linear sawtooth wave is applied to one portion of a coincidence circuit. The sawtooth generator also energizes a peak detector whose output is a function of the period of the synchronizing pulses; a voltage divider network comprising $n+1$ resistors is energized by the output of the peak detector. If the pulses of the input data are equally spaced, the resistors will theoretically be of equal value. A manual switch, whose position depends upon the particular channel to be selected, is connected to the voltage divider and selects a voltage therefrom which is applied to another portion of the coincidence circuit. When the voltages applied to the coincidence circuit are equal, one of the tubes in the coincidence circuit is rendered conductive and produces a gate pulse which triggers a gating circuit and thereby allows data of the selected channel to appear at the channel separator output terminals.

By using a plurality of voltage divider networks and associated switches, as well as a plurality of coincidence circuits and gating circuits, any desired number of channels may be selected simultaneously.

A variable gate width control is also incorporated into the channel separator according to the invention in order to compensate for changes in the rate of commutation.

Also included in the channel separator is a discharge circuit for partially discharging the peak detector capacitor for each synchronizing pulse so that the charge on said capacitor will follow any decrease in the amplitude of the sawtooth wave caused by a decrease in the frame synchronizing period.

An object of this invention is to provide means for electronically selecting a desired number of channels from a plurality of channels in a multiple sequential channel system.

Another object of this invention is to provide an electronic channel separator whose operation is unaffected by changes in the rate of commutation.

A further object of this invention is to provide an electronic channel separator which requires but one reference pulse for each repetitive train of channels rather than one reference pulse for each channel.

The invention, both as to its organization and mode of operation, as well as additional objects and advantages thereof, will best be understood from the following description illustrated by the drawings in which.

Figure 1:
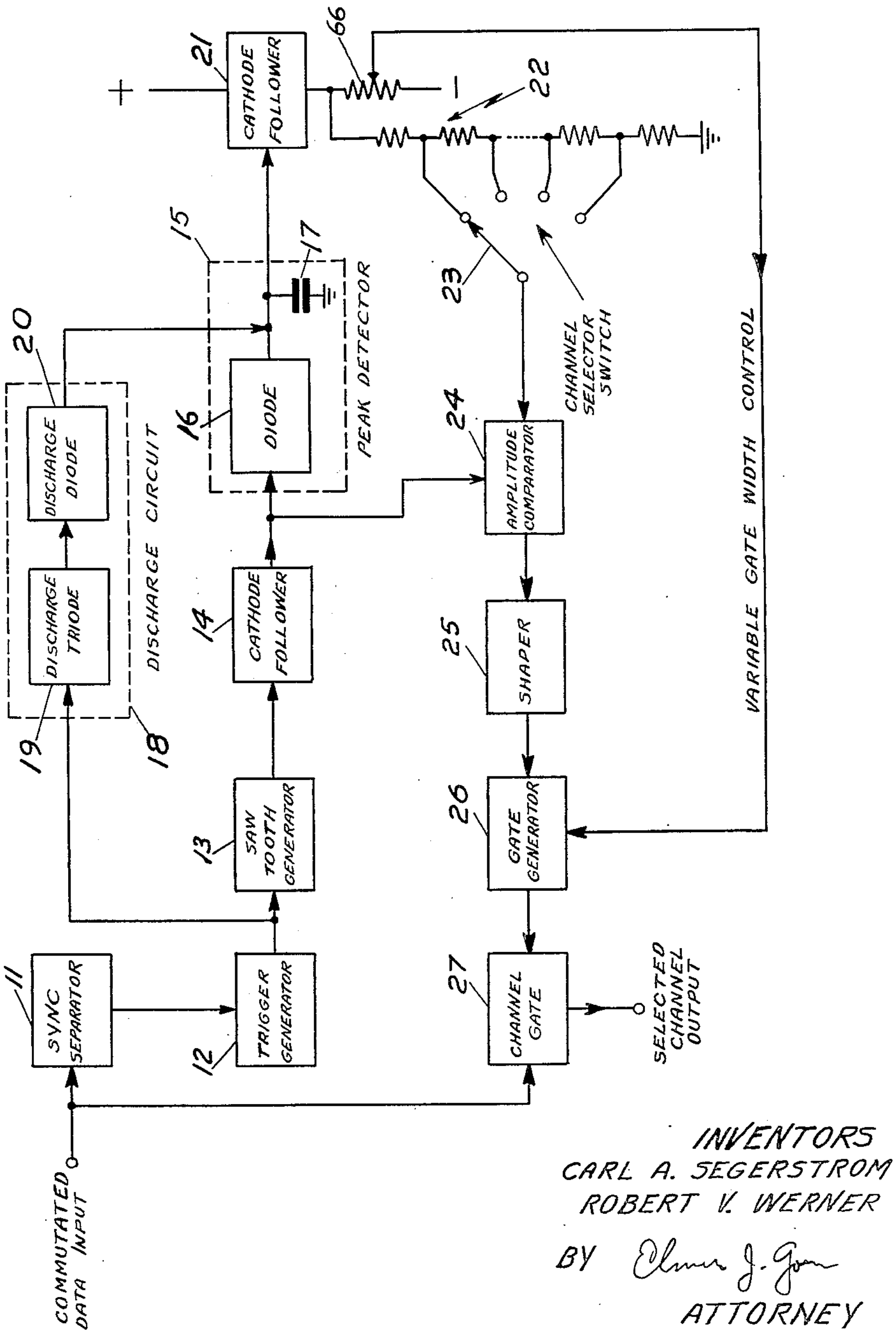
Fig. 1 is a functional block diagram of a first embodiment of a channel separator according to the subject invention.

Referring to Fig. 1, the input data from a telemetering receiver or similar device is fed into a synchronizing signal separator 11 which deletes the channel data from the input signal. The remaining frame synchronizing signals are differentiated and amplified in a trigger generator circuit 12 which produces a trigger pulse adapted to trigger a sawtooth generator 13 into operation. The sawtooth wave form derived from sawtooth generator 13 is substantially linear and has a period equal to the period between successive synchronizing pulses. The output of this sawtooth generator is fed through cathode follower 14 to a peak detector 15 consisting of a diode 16 and a capacitor 17 and whose output is proportional to the time between successive synchronizing pulses.

A portion of the output of trigger generator 12 is applied to a discharge circuit 18 which may, for example, consist of a discharge triode 19 and a discharge diode 20 tied to the capacitor 17 of peak detector 15. Discharge triode 19 is pulsed by the reshaped frame synchronizing pulse and the discharge diode 20 is rendered conductive so that the peak detector capacitor 17 is partially discharged for each frame synchronizing pulse, thereby allowing the charge on capacitor 17 to follow any decrease in the amplitude of the sawtooth wave caused by an increase in the frame synchronizing recurrence rate. This discharge circuit 18 is, of course, not required when the frame synchronizing recurrence rate is either fixed or decreasing.

The output of peak detector 15 is fed through a cathode follower 21 to a resistive voltage divider network 22 composed of a series of resistances connected between the cathode of the cathode follower and ground (or some other point of stable reference potential).

The potential across this divider network is a function of the period or interval between frame synchronizing pulses. If this potential is divided by the number of channels plus one, allowing for the interval used by the synchronizing pulse, the resulting voltage across a selected portion of the divider network when compared in amplitude with the sawtooth wave form derived from sawtooth generator 13 will define the time location of the beginning of the first channel. If a voltage from the voltage divider, which is twice the aforesaid resulting voltage, is compared with the sawtooth wave form from sawtooth generator 13, the location of the second channel may be defined, and so forth. It is possible, therefore, to uniquely locate in time each channel by switching in the potential corresponding to this channel and making amplitude comparison with the sawtooth wave form. A channel selector switch 23 serves to pick off the potential across voltage divider network 22 corresponding to the desired channel. The aforesaid amplitude comparison is made by means of an amplitude comparator circuit 24 to which the output from sawtooth generator 13 and voltage divider 22 are applied. This amplitude comparator may, for example, comprise a triode whose cut-off bias is determined by the amplitude of the voltage picked off from voltage divider 22 and which conducts when the sawtooth wave exceeds said cut-off bias.

The output of amplitude comparator 24 is sharpened by shaper circuit 25 and the pulse produced by the shaper triggers a gate generator circuit 26 whose period is controlled by a variable gate width control means derived from the cathode of cathode follower 21 so that compensation for variations in the synchronizing recurrence frequency may be obtained.

The channel gate circuit 27 connected between the input signal terminals and the output terminals of the device is normally adapted to prevent the passage of the input data signal to the output terminals. Gate circuits 27 may be either electronic gate circuits or fast-acting electromechanical relays. During operation of gate generator 26, however, channel gate circuit 27 is, in effect, opened for a period of time equal to that occupied by a desired channel to be transmitted so that the information contained in the selected channel may be passed through the channel separator to the output terminals.

Figure 2:
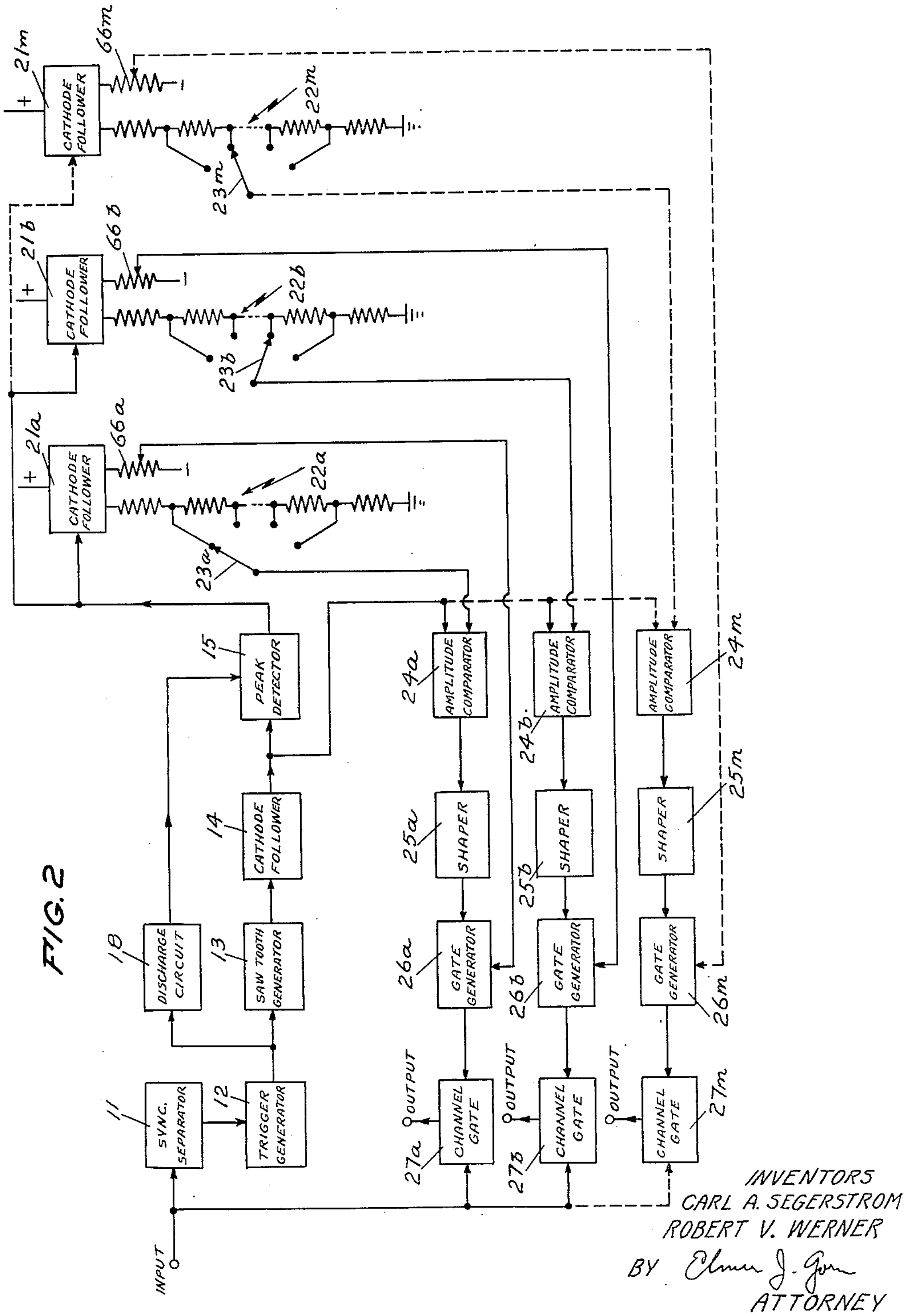
Fig. 2 is a functional block diagram of a second embodiment of the channel separator.

In the embodiment illustrated in Fig. 1, only one channel may be selected at a given instant of time. While this is sufficient in some applications, it is often desirable to be able to separate out simultaneously several of the *n* channels available. An arrangement for accomplishing this plural separation is shown in Fig. 2, in which elements similar or identical to those of Fig. 1 are indicated by like reference numerals.

The portion of the system comprising elements 11 to 18 is identical with the equivalent portion 11 to 18 illustrated in Fig. 1 and described in connection therewith.

The output of peak detector 15 is fed through a plurality of individual cathode followers 21*a*, 21*b* . . . 21*m*, where *m* is the maximum number of channels to be selected concurrently. For example, if three cathode followers 21 are connected in parallel, it is possible to select three of the *n* channels available simultaneously.

Channel selector switches 23*a*, 23*b*, and so forth, associated with resistive voltage divider networks 22*a*, 22*b* and so forth, serve to pick off a voltage output across the corresponding divider networks corresponding to the desired channel. These outputs from the divider networks are connected to corresponding amplitude comparators 24*a*, and so forth. The latter are also energized by the sawtooth voltage derived from sawtooth generator 13. The manner of comparing the amplitudes of the voltages derived from the various voltage divider networks and from the sawtooth generator has already been described in connection with Fig. 1. The outputs from amplitude comparators 24*a*, and so forth, are sharpened by shaper circuits 25*a*, and so forth, and the shaped pulses trigger corresponding gate generator circuits 26*a*, and so forth, whose periods are controlled by the corresponding variable gate width control circuits connected to cathode follower resistors 66*a*, and so forth. A plurality of channel gate circuits 27*a*, and so forth, connected between the signal input terminals are open in response to operation of corresponding gate generators 26*a*, and so forth, thus permitting any number of channels between *l* and *m* to be transmitted through the channel separator system.

Figure 3:
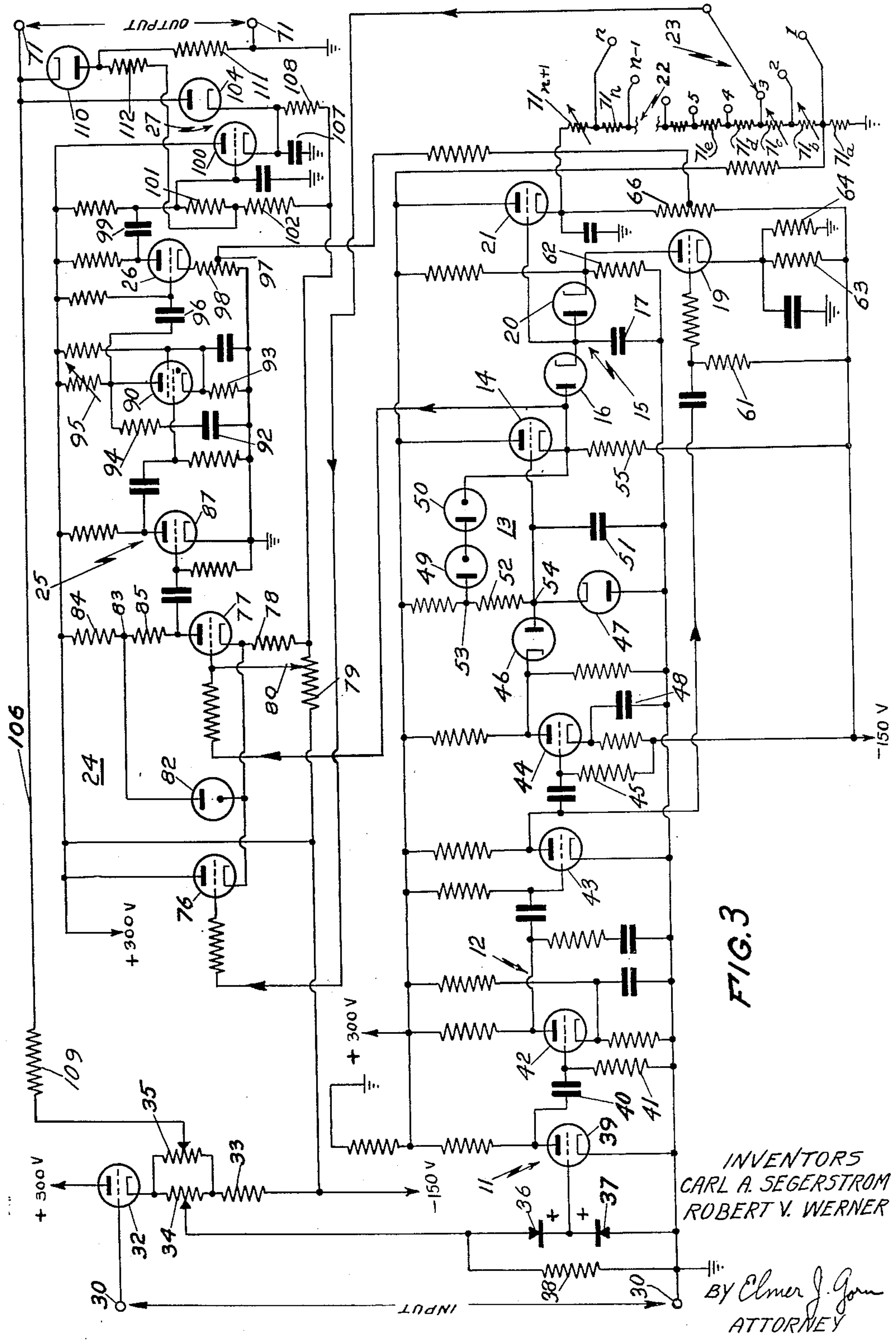
Fig. 3 is a circuit diagram of the channel separator shown in Fig. 1.

Referring to Fig. 3, the input data, including negative synchronizing signals and channel data in the form of positive pulses from a telemetering receiver, for example, is applied across input terminals 30, one of which is connected to ground (or some other point of reference potential), and the other connected to the grid of tube 32. The plate of tube 32 is connected to the positive terminal of a plate power supply which is common to all tubes. The cathode is connected to a negative terminal of a second power supply through a network comprising resistor 33 and potentiometers 34 and 35. Potentiometers 34 and 35 set the base line of the various synchronizing pulses and channel pulses, respectively. The arm of potentiometer 34 is connected to the cathode of diode rectifier 36. The anode of rectifier 36 is connected to the anode of rectifier 37 while the cathode of rectifier 37 is connected to ground. A resistor 38 by-passes the serially-connected rectifiers 36 and 37. The positive channel pulses are attenuated by rectifier 36 and are partially by-passed to ground by way of resistor 38. The negative synchronizing pulses pass through rectifier 36 to the grid of amplifier-inverter tube 39. Rectifier 37 provides further attenuation of positive channel pulses being applied to tube 39 so that the magnitude of the positive channel pulses at the grid of tube 39 is negligible.

The inverted synchronizing pulses appearing at the plate of tube 39 are differentiated by a differentiating circuit comprising capacitor 40 and resistor 41 and are amplified by means of a trigger generator consisting of amplifier stages 42 and 43.

The positive-going portion of the output of tube 42, corresponding to the trailing edge of the positive signals derived in the plate circuit of tube 39, is rendered ineffective owing to the fact that tube 43 is normally heavily conductive so that the output of trigger generator stage 43 is a series of positive pulses, each of which occurs whenever a synchronizing pulse appears at the input terminals.

The output of amplifier 43 is connected to the input circuit of triode 44. Upon the arrival of a positive pulse at the grid of this triode, the tube draws plate current and the plate voltage drops, whereby a negative pulse appears in the plate circuit. Resistor 45 is a grid decoupling resistor which prevents the signal from being by-passed through the low impedance power supply while capacitor 48 is a conventional radio frequency by-pass capacitor.

Diodes 46 and 47, triode 48, neon tubes 49 and 50 and the associated circuitry form a boot strap sawtooth generator. During the period between synchronizing pulses, capacitor 51 is charged through resistor 52 toward B+ and the potential at point 54 rises. This rise in potential of point 54 is fed to the grid of cathode follower 48. The cathode of triode 48 follows the grid voltage by nearly the same magnitude. The cathode of tube 48 thus feeds back through neon tubes 49 and 50 to point 53, the same increase in potential that point 54 experiences. Neon tubes 49 and 50 may be replaced by a capacitor where the change in charge during the period between adjacent synchronizing pulses is sufficiently small. Therefore, a substantially constant potential difference is maintained between points 53 and 54 with the result that a constant charging current is established in resistor 52. This constant current flowing through capacitor 51 will charge the latter at a constant rate and the potential across capacitor 51 will rise linearly with time to produce the desired time sawtooth sweep voltage. Diode 47 is a clamping diode which prevents the potential at point 54 from dropping below ground. At the time of arrival of the synchronizing pulses, tube 44 draws plate current which causes the plate voltage to drop below ground potential. Diode 46 is now rendered conductive and discharges capacitor 51. Diode 47 is a clamping diode which serves to prevent point 54 from dropping below ground.

The output of cathode follower 14 is taken from its cathode across cathode resistor 55 and a portion of the output applied to a peak detector 15 comprising diode 16 and capacitor 17. A voltage produced across capacitor 17 is a direct-current voltage whose magnitude is a function of the rate of recurrence of the synchronizing pulses or, in other words, a direct function of the time between successive synchronizing pulses.

The positive pulses from tube 43 of trigger generator 12 are also applied to the grid of triode amplifier 19. The increased conduction of triode 19 lowers the voltage at the cathode of diode 20 and partially discharges capacitor 17 to ground through resistor 62 and the plate of amplifier 19. In this way some of the charge stored in capacitor 17 during the charging period is bled off so as to ready the peak detector for the next pulse in those cases where the frame synchronizing period is decreasing. Resistors 63 and 64 form a voltage-divider network for establishing proper cathode bias on tube 19. Resistor 60 is a grid-limiting resistor and resistor 61 is a grid-biasing resistor for tube 19.

The voltage across capacitor 17 is applied to the input circuit of cathode follower 21 and a voltage derived across cathode resistor 66 which is dependent upon the amplitude of the voltage across capacitor 17.

A resistive voltage divider network 22 connected between the cathode of cathode follower 21 and ground (or a stable reference potential) is composed of a series of resistors $71_a$, $71_b$, $71_c$ . . . $71_{n+1}$ of substantially equal magnitude and in number equal to one plus the number of information channels. Three of the resistors $71_b$, $71_c$ and $71_{n+1}$ are variable for reasons to be pointed out subsequently. The potential across the entire divider network 22 is a direct function of the interval between synchronizing pulses. By means of a channel selector switch 23 having a plurality of positions 1, 2, 3 . . . *n*, where *n* is the total number of information channels, a selected portion of the potential across divider network 22 corresponding to the channel to be selected is made available for application to the amplitude comparator network comprising tubes 76 and 77.

The positive output from voltage divider network 22 applied to the grid of tube 76 of amplitude comparator 24 (including tubes 76, 77 and 82) increases the current flow in tube 76 and in resistor 78 which is a resistor common to the cathodes of tubes 76 and 77, thereby varying the voltage drop across cathode resistors 78 and thus determining the bias at which tube 77 conducts. A further bias control for tube 77 consists of potentiometer 79 whose arm 80 may be varied to adjust for variations in the tube-operating characteristic and other circuit constants. The sawtooth wave derived from cathode follower 14 is applied to the grid of tube 77 of amplitude comparator 24 and in the course of its voltage rise eventually overcomes the bias on tube 77 resulting from the circuitry including voltage divider network 22 and tube 76.

A neon glow tube 82 connected between the cathodes of tubes 76 and 77 and the junction point 83 between plate resistors 84 and 85 of tube 77 serves to provide a plate voltage supply for tube 77 which is independent of changes in the external supply voltage.

By thus comparing in amplitude the potential corresponding to a desired channel which is derived from the voltage divider network 22 and the sawtooth wave derived from the boot strap sawtooth generator 13, a negative pulse is obtained at the plate of tube 77 whose occurrence corresponds in time to the arrival of the information contained in the desired channel. This pulse from tube 77 is shaped and inverted in a shaper circuit 25 comprising tube 87. Tube 87 is normally conducting heavily and has a small bias so that a very small portion of the negative pulse from tube 77 is used to achieve cut-off. By utilizing only a very limited portion of the negative-going leading edge of the pulse from tube 77, a pulse having a sharp leading edge is derived at the plate of tube 87.

The shaped positive pulse at the output of shaper tube 87 is applied to the grid of thyratron 90 which is normally nonconductive because of the positive bias on its cathode derived across cathode resistor 93. During the nonconductive or quiescent period of tube 90, capacitor 92 charges up to the plate supply voltage. Upon the arrival of the positive trigger pulse from tube 87, however, tube 90 becomes conductive, thereby discharging capacitor 92 at a rate determined by the time constant of the discharge circuit comprising resistor 94 and the resistance of tyhratron 90 and capacitor 92. Resistor 94 isolates capacitor 92 from the plate of tube 90 so that the potential at the plate of tube 90 may drop rapidly during discharge.

At the termination of the pulse at the plate circuit of tube 87, tube 90 is extinguished so that the potential at the plate of tube 90 again rises at a rate determined by resistors 94 and 95 and capacitor 92. Resistor 95 is a variable resistor used to adjust the duration of the channel gate width.

The wave form appearing at the plate of tube 90 is coupled to the grid of gate generator tube 26 by way of coupling capacitor 96. Tube 26 is heavily conductive in its quiescent state and its grid is held at approximately the potential of the cathode because of the diode action of the grid-cathode structure of the triode, causing the plate potential to reach a value substantially below the power supply voltage. The leading edge of the wave form appearing at the grid of tube 91 cuts off this tube so that the plate potential rises toward the power supply voltage and remains at that value until the grid of tube 91 goes sufficiently positive to cause tube 26 to reconduct. The resulting wave form in the plate circuit of tube 26 consists of a positive gate whose width is determined in part by the setting of potentiometer 95 and also, as will be later explained, by the amount of the variable gate width control voltage which automatically compensates for instantaneous variations in the period between synchronizing pulses.

It will be noted that the voltage across the cathode resistor 66 of cathode follower 21 is directly proportional to the period between synchronizing signals and, assuming the channel widths and the spacing, if any, between channels to be constant, this voltage is also directly proportional to the width of each channel. As the frame synchronizing period increases, that is, as the repetition rate of the synchronizing pulses decreases, the higher is the voltage across resistor 66. A portion of this voltage is fed to a point 97 on cathode resistor 98 of tube 26. If the frame synchronizing period increases, the voltage at the cathode of tube 21, which is applied to the cathode of tube 26, increases, therefore increasing the bias on tube 26. The time required for the exponentially rising voltage on the grid of tube 26 to exceed the cut-off point of the tube and terminate the positive gate pulse will thus increase. If, on the other hand, the frame synchronizing period decreases, the bias on tube 26 decreases and the gate pulse derived at the plate of tube 26 is narrowed. Thus, a continuous automatic variable gate width control is obtained, compensating for variation in the repetition rate of the synchronizing pulses.

The positive gate pulses from tube 26 are capacitively coupled by capacitor 99 to the grid of tube 100 which is normally nonconductive because of the connection of its grid to the negative terminal of the negative voltage supply through resistors 101 and 102. A channel gate diode 104 has its anode connected to channel selector output lead 106, one end of which is connected through isolating resistor 109 to the movable arm of potentiometer 35. The cathode of diode 104 of gate 27 is connected to ground through capacitor 107 and through cathode resistor 108 of tube 100, resistor 79 and the negative voltage supply. Output lead 106 is connected to one output terminal 71. The other channel selector output terminal is connected to ground. It should be understood, however, that said other output terminal need not be connected to ground but may be connected to any desired reference potential, provided, of course, that the circuitry is appropriately modified. Since the combined resistance of conductive diode 104 and resistors 108 and 79 are made only a fraction of that of isolating resistor 109, the output of the undesired channel pulses across terminals 71, 71 is made negligible. The purpose of potentiometer 35 is to select the base line of the channel pulses and is similar in operation to potentiometer 34 previously referred to.

Diode 104 is normally-conductive in the absence of positive gating pulses on its cathode so that all the positive-going channel pulses are by-passed to ground through capacitor 107 and through the negative power supply by way of resistors 79 and 108. Thus, the positive channel pulses are normally prevented from appearing across the output terminals 71, 71 of the device.

During the time of occurrence of a desired channel, however, a positive gate pulse is produced, as already described. This gate pulse renders tube 100 conductive and current flows through this tube and its cathode resistor 108 for the duration of the pulse. This flow of current in resistor 108 biases diode 104 to cut-off, hence removing the shunt between lead 106 and resistors 79, 108 and the negative power supply to ground (or other reference potential, as the case may be) and allowing the desired channel information to pass to the output terminals 71, 71 of the device. As soon as the gate pulse corresponding to the desired channel ceases, diode 104 returns to its normally-conductive state and the information in the undesired channel is prevented from reaching output terminals 71, 71.

Diode 110 whose cathode is connected to output lead 106 and whose anode is connected to ground through resistor 111 and to the junction point of resistors 101 and 102 through resistor 112 functions to prevent the passage of synchronizing pulses to the output terminals.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. An electronic commutated channel separator having input and output terminals and adapted to selectively transmit therebetween at least one desired channel of communication from recurring multiple channel trains of signal pulses, each of said trains of pulses including a synchronizing pulse followed by a plurality of channel pulses, comprising first means for separating said synchronizing pulses from the corresponding channel pulses, second means responsive to said synchronizing pulses for producing an output voltage which is a direct function of the period between successive synchronizing pulses, third means responsive to said second means and adapted to select a portion of said voltage corresponding to said desired channel, a gate circuit interposed between said input and output terminals, and fourth means responsive to the output of said second and third means for effecting operation of said gate circuit and transmission of said desired channel.

2. An electronic commutated channel separator as recited in claim 1 including means responsive to said voltage from said second means for maintaining the period of operation of said gate circuit proportional to the instantaneous period between adjacent synchronizing pulses.

3. An electronic commutated channel separator having input and output terminals and adapted to selectively transmit therebetween a plurality of desired channels of communication from recurring multiple channel trains of signal pulses, each of said trains of pulses including a synchronizing pulse followed by a plurality of channel pulses, comprising first means for separating said synchronizing pulses from the corresponding channel pulses, second means responsive to said synchronizing pulses for producing an output potential which is a direct function of the period between successive synchronizing pulses, third means responsive to said output potential from said second means for deriving a plurality of voltages corresponding to said desired channels, said third means further including means for maintaining the period of operation of said gate circuits proportional to the instantaneous period between adjacent synchronizing pulses, a plurality of gate circuits interposed between said input and output terminals, and fourth means responsive to the output of said second and third means for effecting operation of said gate circuits and transmission of said desired channels.

4. An electronic commutated channel separator having input and output terminals and adapted to selectively transmit therebetween at least one desired channel of communication from recurring multiple channel trains of signal pulses, each of said trains of pulses including a synchronizing pulse followed by a plurality of channel pulses, comprising first means for separating said synchronizing pulses from the corresponding channel pulses, second means responsive to said synchronizing pulses for producing a first voltage varying linearly with respect to time, third means energized by said second means for deriving an output voltage which is a direct function of the period between successive synthronizing pulses, fourth means adapted to select a portion of said output voltage corresponding to said desired channel, a gate circuit interposed between said input and output terminals, and fifth means responsive to the output of said second and fourth means for effecting operation of said gate circuit and transmission of said desired channel.

5. An electronic commutated channel separator for selectively separating out at least one desired channel of communication from each of a plurality of multiple channel trains of signal pulses, each of said trains of pulses including a synchronizing pulse followed by a plurality of channel pulses, said channel separator having input terminals and output terminals, comprising means connected to said input terminals for separating said synchronizing pulses from said channel pulses, means responsive to said synchronizing pulse for producing a wave whose period is equal to the time between successive synchronizing pulses, a circuit means energized by said wave for producing an output which is a function of the amplitude of said wave, selector means connected to said circuit means for deriving a selected voltage therefrom corresponding to the channel to be selected, amplitude comparison means responsive to the attainment of equality in amplitude between said wave and said voltage for producing a trigger pulse, and a gate circuit energized by said trigger pulse for allowing transmission of said desired channel to said output terminals.

6. An electronic commutated channel separator as recited in claim 5 including means responsive to said circuit means for maintaining the period of said trigger pulse proportional to the instantaneous period between synchronizing pulses.

7. An electronic commutated channel separator for selectively separating out desired channels of communication from each of a plurality of recurring multiple channel trains of signal pulses, each of said recurring trains of pulses including a synchronizing pulse followed by a plurality of channel pulses, said channel separator having a pair of input terminals and a plurality of pairs of output terminals, comprising means connected to said input terminals for separating said synchronizing pulses from said channel pulses, means responsive to said synchronizing pulse for producing a wave whose period is equal to the time between successive synchronizing pulses, circuit means energized by said wave for producing a plurality of outputs which are a function of the amplitude of said wave, a plurality of selector means connected to said circuit means for deriving selected voltages therefrom corresponding to the channels to be selected, amplitude comparison means responsive to the attainment of equality in amplitude between said wave and each of said voltages for producing a plurality of trigger pulses, and a plurality of gate circuits energized by said corresponding trigger pulses for allowing transmission of said desired channels to said corresponding pairs of output terminals.

8. An electronic commutated channel separator as recited in claim 7 including means responsive to said circuit means for maintaining the period of said trigger pulses proportional to the instantaneous period between said synchronizing pulses.

9. An electronic commutated channel separator for selectively separating out at least one desired channel of communication from each of a plurality of multiple channel trains of signal pulses, one each of said train of pulses being a synchronizing pulse of polarity opposite to that of the remaining pulses, said channel separator having input terminals and output terminals, comprising first means connected to said input terminals for separating out said synchronizing pulses from said channel pulses, second means responsive to said synchronizing pulse for producing a wave whose period is equal to the time between successive synchronizing pulses, third means including a peak detector energized by said wave whose output is a function of the amplitude of said wave, a discharge circuit energized by said synchronizing pulses for resetting said detector during intervals of decreasing period between synchronizing pulses, a voltage divider network connected across said output of said third means, said divider network including means for selecting a voltage therefrom corresponding to the channel to be selected, amplitude comparison means responsive to the attainment of equality in amplitude between said wave and said voltage for producing a trigger pulse, and a gate circuit energized by said trigger pulse for allowing said desired channel to reach said output terminals.

10. An electronic commutated channel separator as recited in claim 9 including means responsive to said third means for maintaining the period of said trigger pulse proportional to the instantaneous period between successive synchronizing pulses.

11. An electronic commutated channel separator for selectively separating out at least one desired channel of communication from each of a plurality of multiple channel trains of signal pulses, one each of said trains of pulses being a synchronizing pulse of polarity opposite to that of the remaining pulses, said channel separator having input terminals and output terminals, comprising means connected to said input terminals for separating out said synchronizing pulses from said channel pulses, means responsive to said synchonizing pulse for producing a sawtooth wave whose period is equal to the time between successive synchronizing pulses, a period detector energized by said sawtooth wave for producing an output which is a function of the amplitude of said sawtooth wave, a voltage divider network across which a portion of said detector output is derived, said divider network including means for selecting a voltage therefrom corresponding to the channel to be selected, amplitude comparison means responsive to the attainment of equality in amplitude between said sawtooth wave and said voltage for producing a trigger pulse, and a gate circuit energized by said trigger pulse for allowing said desired channel to reach said output terminals.

12. An electronic commutated channel separator for selectively separating out desired channels of communication from each of a plurality of multiple channel trains of signal pulses, one each of said trains of pulses being a synchronizing pulse of polarity opposite to that of the remaining pulses, said channel separator having a pair of input terminals and a plurality of pairs of output terminals, comprising means connected to said input terminals for separating said synchronizing pulses from said channel pulses, means responsive to said synchronizing pulse for producing a sawtooth wave whose period is equal to the time between successive synchronizing pulses, a period detector energized by said sawtooth wave for producing an output which is a function of the amplitude of said sawtooth wave, a plurality of voltage divider networks across which various portions of said detector output are derived, said divider networks including means for selecting a voltage therefrom corresponding to the channels to be selected, a plurality of amplitude comparison means responsive to the attainment of equality in amplitude between said wave and said corresponding voltages for producing corresponding trigger pulses, and a plurality of gate circuits energized by said corresponding trigger pulses for allowing transmission of said desired channels to the associated pairs of output terminals.

13. An electronic commutated channel separator for selectively separating out desired channels of communication from each of a plurality of multiple channel trains of signal pulses, each of said trains of pulses including a synchronizing pulse of one polarity followed by a plurality of channel pulses of opposite polarity to that of said synchronizing pulses, said channel separator having a pair of input terminals and a plurality of pairs of output terminals, comprising means connected to said input terminals for separating said synchronizing pulses from said channel pulses, means responsive to said synchronizing pulses for producing a wave whose period is equal to the time between successive synchronizing pulses, circuit means including a peak detector energized by said wave for producing an output which is a function of the amplitude of said wave, a discharge circuit energized by said synchronizing pulses for resetting said detector during intervals of increasing period between synchronizing pulses, a plurality of selector means connected to said circuit means for deriving selected voltages therefrom corresponding to the channels to be selected, amplitude comparison means responsive to the attainment of equality in amplitude between said wave and said corresponding voltages for producing corresponding trigger pulses, means responsive to said circuit means for maintaining the period of said trigger pulses proportional to the instantaneous period between successive synchronizing pulses, and a plurality of gate circuits energized by said trigger pulses for allowing transmission of said desired channels to the associated pairs of output terminals.

14. An electronic commutated channel separator having input and output terminals and adapted to selectively transmit therebetween at least one desired channel of communication from recurring multiple channel trains of signal pulses, each of said trains of pulses including a synchronizing pulse followed by a plurality of channel pulses, comprising first means for separating said synchronizing pulses from the corresponding channel pulses, second means initiated by said separated synchronizing pulses for deriving a first voltage varying linearly with respect to time during the period between successive synchronizing pulses, third means responsive to said second means for producing a second voltage of magnitude proportional to the period between successive synchronizing pulses, fourth means across which a third voltage representative of said second voltage is derived, fifth means for selecting a fractional part of said third voltage which is equal to the ratio of the time interval between said synchronizing pulse and said desired channel to the period between successive synchronizing pulses, sixth means responsive to said first and third voltages for deriving a gate pulse whose leading edge coincides in time with the attainment of equality between said first and third voltages and whose period is substantially equal to the width of said desired channel, and gating means operable in response to said gate pulse for effecting transmission of said desired channel.

15. An electronic commutated channel separator as recited in claim 14 in which said sixth means further includes means for maintaining the period of said gate pulse proportional to the instantaneous period between synchronizing pulses.

16. An electronic commutated channel separator having a pair of input and a plurality of pairs of output terminals and adapted to selectively transmit therebetween desired channels of communication from recurring multiple channel trains of signal pulses, each of said trains of pulses including a synchronizing pulse followed by a plurality of channel pulses, comprising first means for separating said synchronizing pulses from the corresponding channel pulses, second means initiated by said separated synchronizing pulses for deriving a first voltage varying linearly with respect to time during the period between successive synchronizing pulses, third means responsive to said second means for producing a second voltage of magnitude proportional to the period between successive synchronizing pulses, fourth means across which a plurality of equal output voltages representative of said second voltage are derived, fifth means for selecting fractional parts of said output voltages which are equal to the ratio of the time interval between said synchronizing pulse and said corresponding desired channels to the period between successive synchronizing pulses, sixth means responsive to the outputs of said second and fifth means for deriving corresponding gate pulses whose leading edge coincides in time with the attainment of equality between said outputs of said second and fifth means and whose periods are substantially equal to the width of said desired channels, and a plurality of gating means operable in response to said corresponding gate pulses for effecting transmission of said desired channels.

17. An electronic commutated channel separator as recited in claim 16 in which said sixth means further includes means for maintaining the period of said gate pulses proportional to the instantaneous period between synchronizing pulses.

References Cited in the file of this patent

UNITED STATES PATENTS

| | | |
|---|---|---|
| 2,443,198 | Sallach | June 15, 1948 |
| 2,468,703 | Hammel | Apr. 26, 1949 |
| 2,524,832 | Poylo | Oct. 10, 1950 |
| 2,537,056 | Hoeppner | Jan. 9, 1951 |